(12) United States Patent
Du et al.

(10) Patent No.: US 10,210,590 B2
(45) Date of Patent: *Feb. 19, 2019

(54) APPLICATION-TAILORED OBJECT RE-USE AND RECYCLING

(71) Applicant: Facebook, Inc., Menlo Park, CA (US)

(72) Inventors: Qixing Du, Sunnyvale, CA (US); Ashwin Bhat, Redwood City, CA (US); Jonathan M. Kaldor, San Mateo, CA (US); I Chien Peng, Palo Alto, CA (US); Joshua Li, Mountain View, CA (US); Kang Zhang, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/654,956

(22) Filed: Jul. 20, 2017

(65) Prior Publication Data

US 2017/0316539 A1    Nov. 2, 2017

Related U.S. Application Data

(63) Continuation of application No. 13/861,250, filed on Apr. 11, 2013.

(51) Int. Cl.
    *G06F 17/00* (2006.01)
    *G06F 17/30* (2006.01)
    (Continued)

(52) U.S. Cl.
    CPC .............. *G06T 1/00* (2013.01); *G06F 3/0485* (2013.01); *G06F 9/451* (2018.02);
    (Continued)

(58) Field of Classification Search
    CPC ........... G06F 17/30902; G06F 12/0866; G06F 12/0888
    See application file for complete search history.

(56) References Cited

U.S. PATENT DOCUMENTS

| 6,182,133 B1 | 1/2001 | Horvitz |
| 6,912,533 B1 | 6/2005 | Hornick |

(Continued)

FOREIGN PATENT DOCUMENTS

| CN | 101436131 A | 5/2009 |
| CN | 101866285 | 10/2010 |

(Continued)

OTHER PUBLICATIONS

ETutorials, "4.2 Object Reuse/Chapter 4. Object creation/Java performing tuning/programming" Nov. 7, 2012, eTutorials.org, pp. 1-10.*

(Continued)

*Primary Examiner* — Ariel Mercado
(74) *Attorney, Agent, or Firm* — Baker Botts L.L.P.

(57) ABSTRACT

In one embodiment, a computing device receives receive a request for particular content associated with an application. The device may determine, based on a first recycling policy associated with a first recycler, that the first recycler associated with the application includes a display object that is capable of being used for containing the particular content. The device may encapsulate the display object with the particular content in a wrapper object and return the wrapper object encapsulating the display object in response to the request. The device may receive an indication that the display object is no longer needed, and extract the display object from the wrapper object. The display object may be stored in the first recycler. The wrapper object without the display object may be disposed in accordance with a second recycling policy associated with a second recycler associated with an operating system of the computing device.

20 Claims, 6 Drawing Sheets

(51) Int. Cl.
    *G06T 1/00*     (2006.01)
    *G06F 3/0485*     (2013.01)
    *G06F 12/02*     (2006.01)
    *G06F 12/0875*     (2016.01)
    *G06F 9/451*     (2018.01)
    *G06F 9/445*     (2018.01)

(52) U.S. Cl.
    CPC ...... *G06F 12/0253* (2013.01); *G06F 12/0875* (2013.01); *G06F 9/44557* (2013.01); *G06F 12/023* (2013.01)

(56) References Cited

U.S. PATENT DOCUMENTS

| | | | |
|---|---|---|---|
| 7,430,340 | B2 | 9/2008 | Glass |
| 7,975,019 | B1 | 7/2011 | Green |
| 2004/0255246 | A1 | 12/2004 | Douglis |
| 2005/0010877 | A1 | 1/2005 | Udler |
| 2006/0242557 | A1 | 10/2006 | Nortis, III |
| 2010/0023690 | A1* | 1/2010 | Dewar .............. G06F 17/30902 711/118 |
| 2010/0325579 | A1 | 12/2010 | Sandford |
| 2011/0022611 | A1* | 1/2011 | Yorke .................. G06F 9/4435 707/756 |
| 2011/0040718 | A1* | 2/2011 | Tendjoukian ....... H04L 67/2847 706/52 |
| 2011/0055683 | A1 | 3/2011 | Jiang |
| 2011/0202847 | A1 | 8/2011 | Dimitrov |
| 2012/0110435 | A1 | 5/2012 | Green |
| 2012/0182581 | A1 | 7/2012 | Fujita |
| 2012/0254292 | A1 | 10/2012 | Newton |
| 2012/0278704 | A1 | 11/2012 | Ying |
| 2012/0284662 | A1 | 11/2012 | Kumar |
| 2013/0013990 | A1 | 1/2013 | Green |
| 2013/0290641 | A1* | 10/2013 | Corrie ................. G06F 12/0875 711/133 |

FOREIGN PATENT DOCUMENTS

| | | |
|---|---|---|
| CN | 102150175 A | 8/2011 |
| EP | 1513074 | 3/2005 |
| JP | 07219738 | 8/1995 |
| JP | 09-62570 | 3/1997 |
| JP | 2001-105671 | 4/2001 |
| JP | 2002-175142 | 6/2002 |
| JP | 2007286745 | 1/2007 |
| JP | 2007-265164 | 10/2007 |
| JP | 2012-185836 | 9/2012 |
| JP | 2013-003651 | 1/2013 |
| WO | WO 2014/157855 A1 | 10/2014 |

OTHER PUBLICATIONS

Extended European Search Report received from the European Patent Office, for European Patent Application No. 17156820.7-1879/3220264, dated Jul. 9, 2017.
Notification of Reasons for Rejection from Japanese Patent Office for Application No. PCT/US2014/032823 (with English Translation), dated Feb. 6, 2018.
Notification of Reasons for Rejection Regarding Application No. 2017-078681 from Japanese Patent Office (English Translation), dated May 8, 2018.
Notification of the First Office Action regarding Application No. 2014800332185 from The State Intellectual Property Office of The People's Republic of China, dated Mar. 2, 2018.
Notice of Allowance for Application No. 10-2015-7032199 from Korean Intellectual Property Office (with English Translation), dated Mar. 13, 2018.
Notification of The First Office Action for Application No. 2014-800339269 from The State Intellectual Property Office of The People's Republic of China, dated Jan. 17, 2018.
Examination Report No. 1 for Standard Patent Application No. 2014251235 from Australian Government IP Australia, dated Dec. 11, 2017.
Suparna Bhattacharya et. al, "Reuse, Recycle to Debloat Software", Object Oriented Programming, Springer Berlin, Heidelberg, Jul. 25, 2011.
Zhao, et al., "Allocation Wall: a Limiting Factor of Java Applications of Emerging Multi-core Platforms", Object Oriented Programming Systems Languages and Applications, New York, New York, Oct. 25, 2009.
Notice of Preliminary Rejection for Application No. 10-2015-7032199 from Korean Intellectual Property Office, dated Dec. 27, 2017.
Japanese Office action Rejection for Application No. 2016-507567 (without English Translation), dated Jan. 9, 2018.
AU OA received for Patent Application No. 2017210529, dated Aug. 8, 2018.
MX OA received for Patent Application No. MX/a/2015/014580. (with English Translation), dated Jul. 26, 2018.
JP OA received from JPO for Patent Application No. JP2016-508957. (with English Translation), dated May 31, 2018.
IL OA received for Patent Application No. 248442. (with English Translation), dated May 28, 2018.
CN OA received for Patent Application No. 2014800339269. (with English Translation), dated Jul. 11, 2018.
EP Communication received from EPO for Patent Application No. 14785263.6-1222, dated Sep. 11, 2018.
CA Office Action received from CAIPO for Patent Application No. 2,909,075, dated Oct. 29, 2018.
AU Office Action received for Patent Application No. 2014254368, dated Nov. 27, 2018.
AU Office Action received for Patent Application No. 2014254368, dated Dec. 3, 2018.

* cited by examiner

APPLICATION-TAILORED OBJECT RE-USE AND RECYCLING

PRIORITY

This application is a continuation under 35 U.S.C. § 120 of U.S. patent application Ser. No. 13/861,250, filed 11 Apr. 2013, is now U.S. Pat. No. 9,760,964.

TECHNICAL FIELD

This disclosure generally relates to object lifecycle management.

BACKGROUND

Creating display objects and filling them with content may constitute a significant cause of latency for content-intensive applications. When rendering a content layout for a particular display screen where the content extends below the fold (requiring the user to scroll the content layout to bring content into view), display objects may be created and filled with content as they come into view and recycled as they disappear from view. Default recycling utilities provided by an operating system may prove insufficient for the requirements of such a content-intensive application, particularly for applications where recently-requested display objects may be requested again within a short period of time, possibly repeatedly.

SUMMARY OF PARTICULAR EMBODIMENTS

In order to facilitate re-use and recycling of expensive display objects in a content-aware manner, an application may apply application-specific recycling policies to determine how to assess and when to divert the display objects to an application-tailored object recycler for re-use by the application. Upon receiving a request for a particular content element to be displayed, the application creates a display object and renders the display object. Prior to returning it to the operating system for display, the application may enclose the display object in a cheaply-created wrapper object, depending on an assessment of the display object in light of the application-specific recycling policies. When the operating system calls the object's finalize method in preparation to send the object to the operating system's default recycling utility, the application extracts and caches the display object in the recycler, and allows the operating system to dispose of the (empty) wrapper object in accordance with its default recycling policies. When the same content element is requested again, the application retrieves the display object from the recycler, encloses it in a wrapper object, and returns the wrapped display object.

DESCRIPTION OF EXAMPLE EMBODIMENTS

Figure 1A:
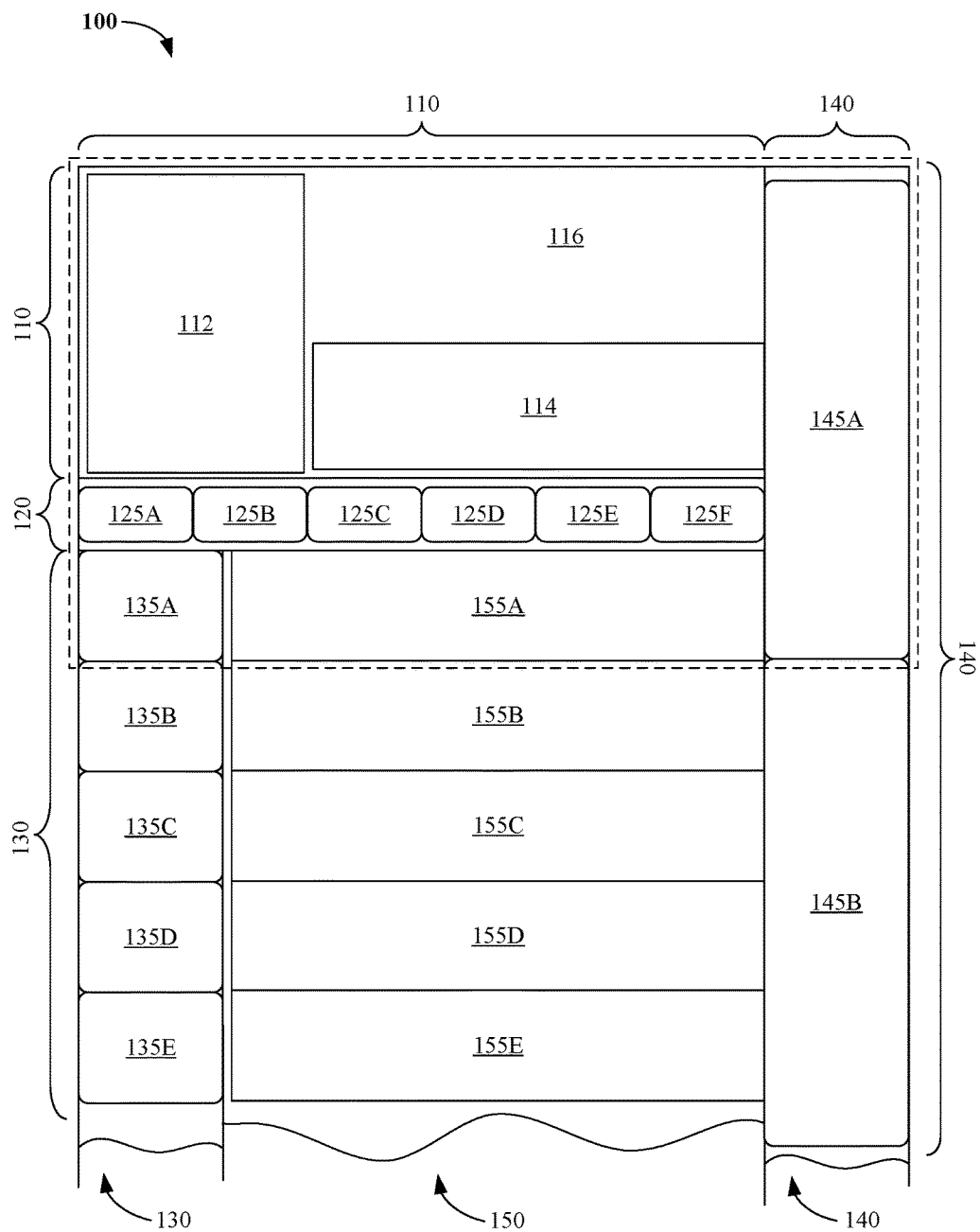
FIG. 1A is a wireframe of a content layout rendered using display objects.

Recycling of display objects by a default recycling utility may be handled uniformly without any awareness of content-based or usage-based context. This can trigger unnecessary and expensive operations to create display objects more often than might otherwise be necessary and to fill inefficiently-recycled display objects with content. When a display object has the potential to become very large (e.g., ANDROID's ListView or GridView objects), and the user may traverse the list or grid back and forth past the same content elements repeatedly, it becomes even more desirable to avoid unnecessary operations due to a failure to efficiently reuse display objects that were recently requested.

In order to facilitate re-use and recycling of expensive display objects in a content-aware manner, an application may apply application-specific recycling policies to determine how to assess and when to divert the display objects to an application-tailored object recycler for re-use by the application. Upon receiving a request for a particular content element to be displayed, the application creates a display object and renders the display object. Prior to returning it to the operating system for display, the application may enclose the display object in a cheaply-created wrapper object, depending on an assessment of the display object in light of the application-specific recycling policies. When the operating system calls the object's finalize method in preparation to send the object to the operating system's default recycling utility, the application extracts and caches the display object in the recycler, and allows the operating system to dispose of the (empty) wrapper object in accordance with its default recycling policies. When the same content element is requested again, the application retrieves the display object from the recycler, encloses it in a wrapper object, and returns the wrapped display object. The wrapper object itself may be created anew or provided by the operating system's default recycling utility—any latency due to creation of a new wrapper object is very low in comparison to the expensive operations of creating and/or filling a display object.

In particular embodiments, the recycler may be implemented using any suitable data structure (e.g., a heap) from which display objects may be stored in and retrieved from the recycler using any retrieval key that is appropriate for the application. For example, in a chronologically-organized newsfeed application provided by a social-networking system where each listing in the newsfeed is related to activity of a connection in a user's social graph, each display object may be stored in association with a retrieval key comprising: a newsfeed item ID number, a hash key generated based on an element of the newsfeed item, a position of the newsfeed item in the newsfeed, a timestamp associated with the newsfeed item, an identifier generated based on identifier(s) associated with any element(s) in a social graph to which the particular content is related, or a hash key based on information associated with any element(s) in a social graph to which the particular content is related. In particular embodiments, there may be one or more recyclers for an application, based upon the requirements of the application. For example, an application may maintain one recycler per display object type. In another example, the application may maintain one recycler for display objects that expire quickly and/or must be updated frequently and another recycler for display objects that do not expire or that remain valid for longer periods of time. As one of skill in the art would be aware, any number of recyclers may be utilized, as appropriate for the requirements of a specific application.

The embodiments described herein may also be performed with sub-elements of a display object, some of which may comprise nested display objects.

FIG. 1A is a wireframe illustrating an example wireframe of a content layout 100 a newsfeed page for a user of a social-networking system that is rendered for display on a tablet device based on a number of display objects. The displayable region of content layout 100 (indicated by the dashed line) includes the portion of content layout 100 that will fit within the screen dimensions of the tablet device (above the fold).

Content layout 100 includes a header region 110, a menu bar 120, a left-hand sidebar 130, a right-hand sidebar 140, and a main body area 150. Each region is associated with its own display object, each of which may include a number of elements such as, by way of example and not limitation: image(s), video, text, links, forms, and interactive elements. Each of these elements may be represented by one or more nested display objects.

The display object associated with header region 110 includes an interactive profile photo 112 of the social-network user, text block 114, a background image 116, and theme music selected by the social-network user. Interactive profile photo 112 is rendered based on a display object that may include an image, text, a link, and Javascript code to render a pop-up window displaying a summary of a profile of the social-network user that appears when a pointing device, such as a mouse, hovers over the profile photo.

The display object associated with menu bar 120 includes five menu options 125A-F, each of which comprises an image, text, and a link.

The display object associated with left-hand sidebar 130 includes content for a mix of recommendations (including sponsored stories) (only 135A-E are shown, but there may be many more recommendations), each of which is rendered based on a display object. Each display object for a recommendation may include an interactive image, a title, text for the recommendation, and a link to obtain further information related to the recommendation. Each display object for a newsfeed item may also include one or more images or a video The display object associated with right-hand sidebar 140 includes content for one or more advertisements 145, each of which is rendered based on a display object. As illustrated in the example shown in FIG. 1A, advertisement 145A appears above the fold, whereas 145B is not yet in view. The content of the advertisement may be determined at least in part by a third-party advertiser.

The display object associated with main body area 150 includes a number of newsfeed items (only 155A-E are shown, but there may be many more newsfeed items), each of which is rendered based on a display object associated with an activity related to friend (i.e., social-graph connection) of the user.

Figure 1B:
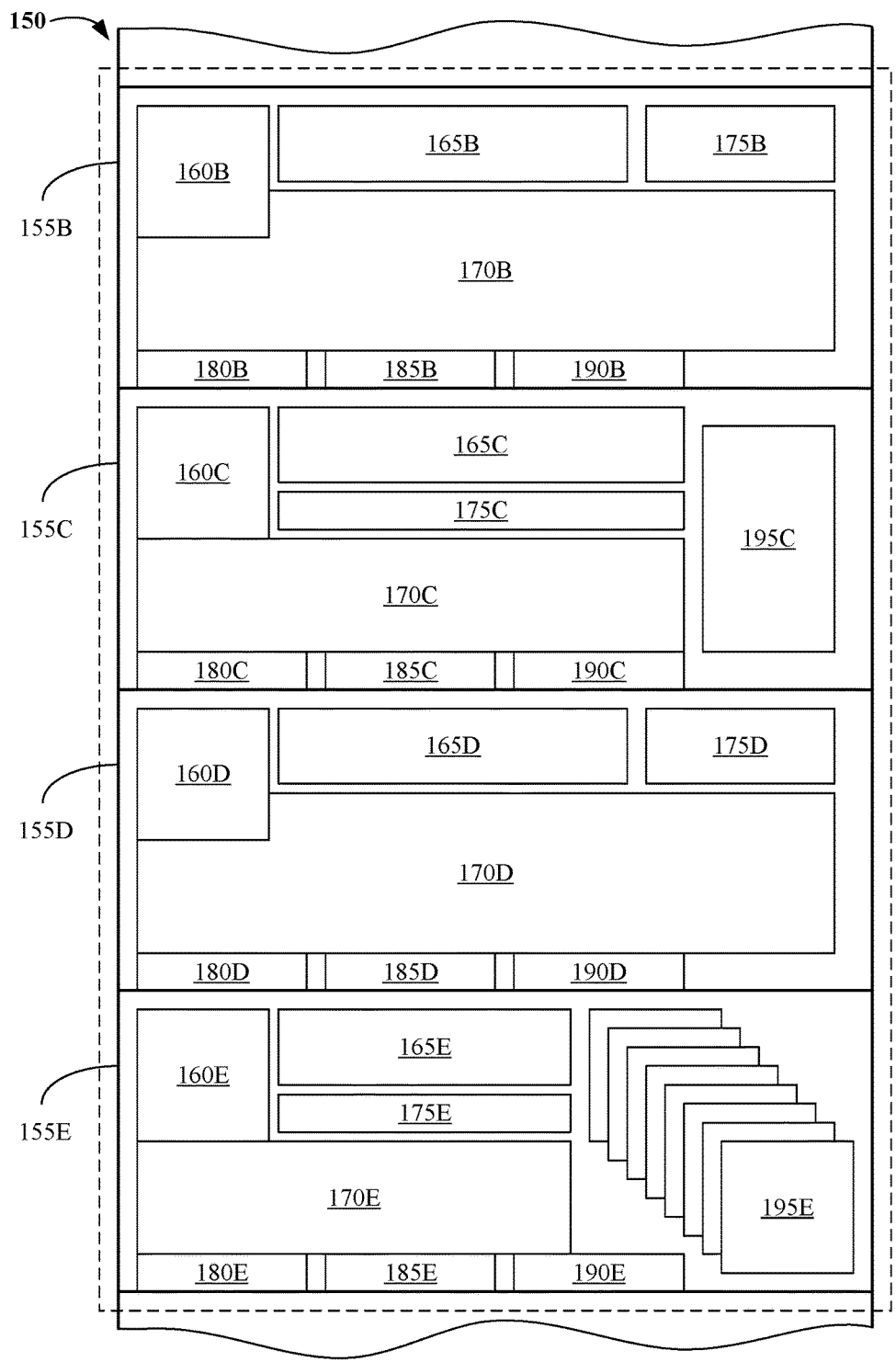
FIG. 1B is a wireframe illustrating a detailed section of FIG. 1A.

FIG. 1B is a wireframe illustrating a detailed section of FIG. 1A: newsfeed items 155B-E in the main body area 150 of content layout 100. As indicated in FIG. 1A, the displayable region of content layout 100 (indicated by the dashed line) includes the portion of content layout 100 that will fit onto the screen of the tablet device.

Each display object for a newsfeed item 155 may include an interactive profile photo of the friend 160, a name of the friend 165, text for the newsfeed item 170, time-sensitive information 175 (e.g., a constantly-updating count of the number of people who have viewed/commented on/"Liked" the listing, a short listing of the most recent one or two people who viewed/commented on/"Liked" the listing, etc.), a link to "Like" the newsfeed item 180, a link to comment on the newsfeed item 185, and a link to "Share" the newsfeed item 190. Each display object for a newsfeed item may also include one or more images 195 or a video.

Each interactive profile photo 160 is rendered based on a display object that may include an image, text, a link, and Javascript code to render a pop-up window displaying a summary of a profile of the social-network user that appears when a pointing device, such as a mouse, hovers over the profile photo.

Figure 2:
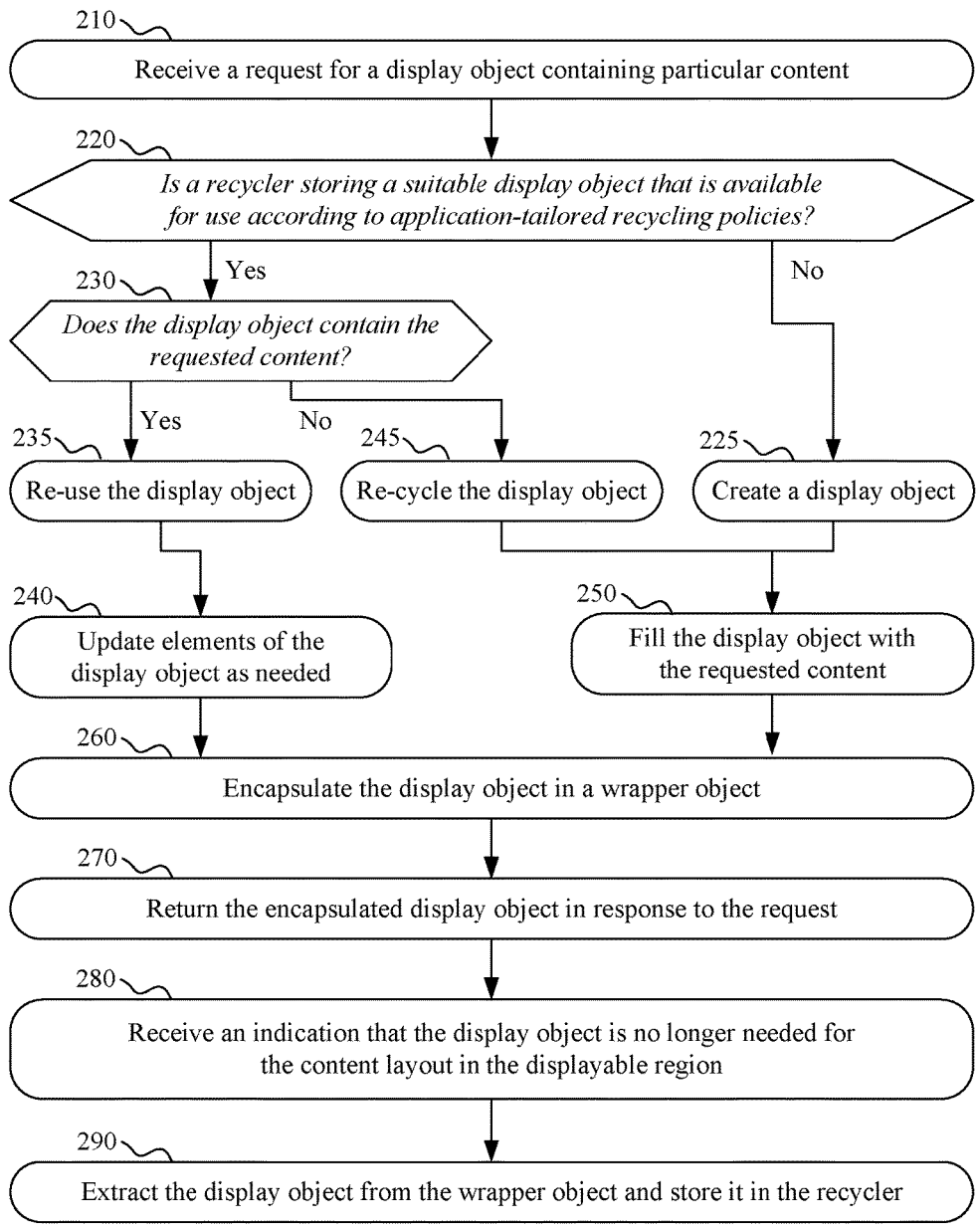
FIG. 2 illustrates an example method for application-controlled object recycling.

FIG. 2 illustrates an example method for application-controlled object recycling. In step 210, an application receives a request for particular content (e.g., newsfeed item 155C), to which it needs to respond with a display object containing the requested content. As described above, the display object may contain a number of elements, which may themselves be display objects. For example, newsfeed item 155C includes an interactive profile photo 160 that may be rendered by a display object.

In step 220, the application determines whether there is a display object in the application-tailored recycler that may be suitable for re-use or recycling in accordance with application-tailored recycling policies. A display object may be suitable for re-use if it contains the same or similar content as that which is currently being requested. A display object may be suitable for recycling if it is the same type of object but is filled with different content. This determination may be dependent upon application-specific, device-specific, and/or user-specific recycling policies. In particular embodiments, an application may set recycling policies in accordance with application requirements, content types, device attributes (e.g., available memory and/or dimensions of a display screen), content statistics, usage patterns and preferences, or any other appropriate factor(s). Such policies may govern how many objects to retain in the recycler, what types of objects to store in the recycler, how to determine whether a display object is suitable for re-use and/or re-cycling, when to re-use versus recycle a display object, etc.

In step 225, there are two situations in which the recycler returns a null. The first situation is simple—no display object of the correct type was found in the recycler. In the second situation, a display object suitable for recycling but not re-use was found in the recycler, however recycling policies prohibit recycling of the display object.

For example, in the newsfeed layout shown in FIG. 1B, the user previously viewed and scrolled past newsfeed item 155A and the displayable region is occupied by newsfeed items 155B-E. This means that a display object for newsfeed item 155A would have been previously generated, filled with content, displayed, and then stored in the recycler. If the user scrolls down, and the application receives a request for a display object containing content for newsfeed item 155F, then the application will determine whether the display object for newsfeed item 155A can be recycled for newsfeed item 155F. If the application only permits recycling of objects once a number of display objects have been stored in the recycler (so as to promote re-use, rather than constant recycling), then the recycler may return a null, in order to force creation of a new display object for newsfeed item 155F (and preserve the display object for newsfeed item 155A in anticipation that newsfeed item 155A may be requested again soon).

In either case, the application creates a new display object of an appropriate type to display the requested content, and then fills the display object with the requested content (step 250). This is the most expensive path, since both creating the new display object and filling an empty display object are costly operations. Therefore, an application may need to balance conflicting priorities when determining when to prohibit recycling of otherwise suitable display objects stored in the recycler.

In step 230, if a suitable display object is available in the recycler, the application determines whether the content in the display object is the same as or similar to the requested content.

In step 235, if the display object contains the same or similar content as the requested content, the application can re-use the retrieved display object for this request. For example, in the newsfeed layout shown in FIG. 1B, the user previously viewed and scrolled past newsfeed item 155A and the displayable region is occupied by newsfeed items 155B-E. This means that a display object for newsfeed item 155A would have been previously generated, filled with content, displayed, and then stored in the recycler. If the user scrolls back up, and the application receives a request for a display object containing content for newsfeed item 155A, then the display object containing the content for newsfeed item 155A can be retrieved from the recycler and re-used.

In order to re-use the retrieved display object, it may be necessary to update particular elements of the display object as needed (step 240), such as time-sensitive elements. For example, a newsfeed item 155 may need to update time-sensitive information 175 (e.g., a constantly-updating count of the number of people who have viewed/commented on/"Liked" the listing, a short listing of the most recent one or two people who viewed/commented on/"Liked" the listing, etc.). In some cases, the content contained in the display object may be very similar to the requested content but not exactly the same. In some embodiments, the application may be aware of which elements need to be updated, and just update those elements. In some embodiments, the application may perform a content comparison (e.g., comparing hashes) to determine which elements need to be updated and which do not. In some embodiments, the application may be able to determine which elements need to be updated based on metadata and/or attributes associated with the requested content.

Application-tailored recycling policies may apply rules to determine when it is efficient to update particular elements on an as-needed basis and when it may be more efficient to re-fill the display object from scratch (see step 250). Regardless, re-use of a display object is typically the least expensive path, since two costly operations are eliminated: creating the new display object and filling an empty display object.

In step 245, if the display object in the recycler is the same display object type, but it is not filled with the same or very similar content as the requested content, the application can re-cycle the display object for this request. For example, in the newsfeed layout shown in FIG. 1B, the user previously viewed and scrolled past newsfeed item 155A and the displayable region is occupied by newsfeed items 155B-E. This means that a display object for newsfeed item 155A would have been previously generated, filled with content, displayed, and then stored in the recycler. If the user scrolls down, and the application receives a request for a display object containing content for newsfeed item 155F, then the display object containing the content for newsfeed item 155A can be retrieved from the recycler and re-cycled for newsfeed item 155F (if permitted by the application's recycling policies).

In this case, the application fills the display object with the requested content (step 250) from scratch, thereby overwriting most if not all of the existing content in the display object. This is less desirable than re-use of the display object, since filling an display object is a costly operation, but recycling at least avoids the cost of the creating a new display object as well. In particular embodiments, at this point, steps 220-270 may be performed in a recursive manner with sub-elements of a display object, some of which may themselves comprise nested display objects.

In step 260, the application may encapsulate the display object in a wrapper object. In particular embodiments, the default recycling utility provided by the operating system may have attempted to provide a recycled wrapper object based on the requested display object. If a wrapper object was provided for the display object, then the application may use the provided wrapper object; if not, then the application may create a new wrapper object. In step 270, the application returns the encapsulated display object in response to the request.

In step 280, the application may receive an indication that the display object is no longer needed for the content layout in the display region. In step 290, the application stores the display object in the recycler. If a wrapper object was used, the application may extract the display object from the wrapper object prior to storing the display object, so as to allow the default recycling utility provided by the operating system to recycle the now-empty wrapper object.

Embodiments disclosed herein are described as being performed by an application; however, as one of skill in the art would be aware, many of the steps in example method 200 and other embodiments disclosed herein may be performed by one or more pieces of software operating at one or more layers of abstraction. For example, within the context of the ANDROID operating system, a recycler may be provided for a fragment and/or a recycler may be provided for an activity. In another example, the functions of a recycler may be performed by software that executes separately from the application.

Particular embodiments may repeat one or more steps of the method of FIG. 2, where appropriate. Although this disclosure describes and illustrates particular steps of the method of FIG. 2 as occurring in a particular order, this disclosure contemplates any suitable steps of the method of FIG. 2 occurring in any suitable order. Moreover, although this disclosure describes and illustrates particular components, devices, or systems carrying out particular steps of the method of FIG. 2, this disclosure contemplates any suitable combination of any suitable components, devices, or systems carrying out any suitable steps of the method of FIG. 2.

Figure 3:
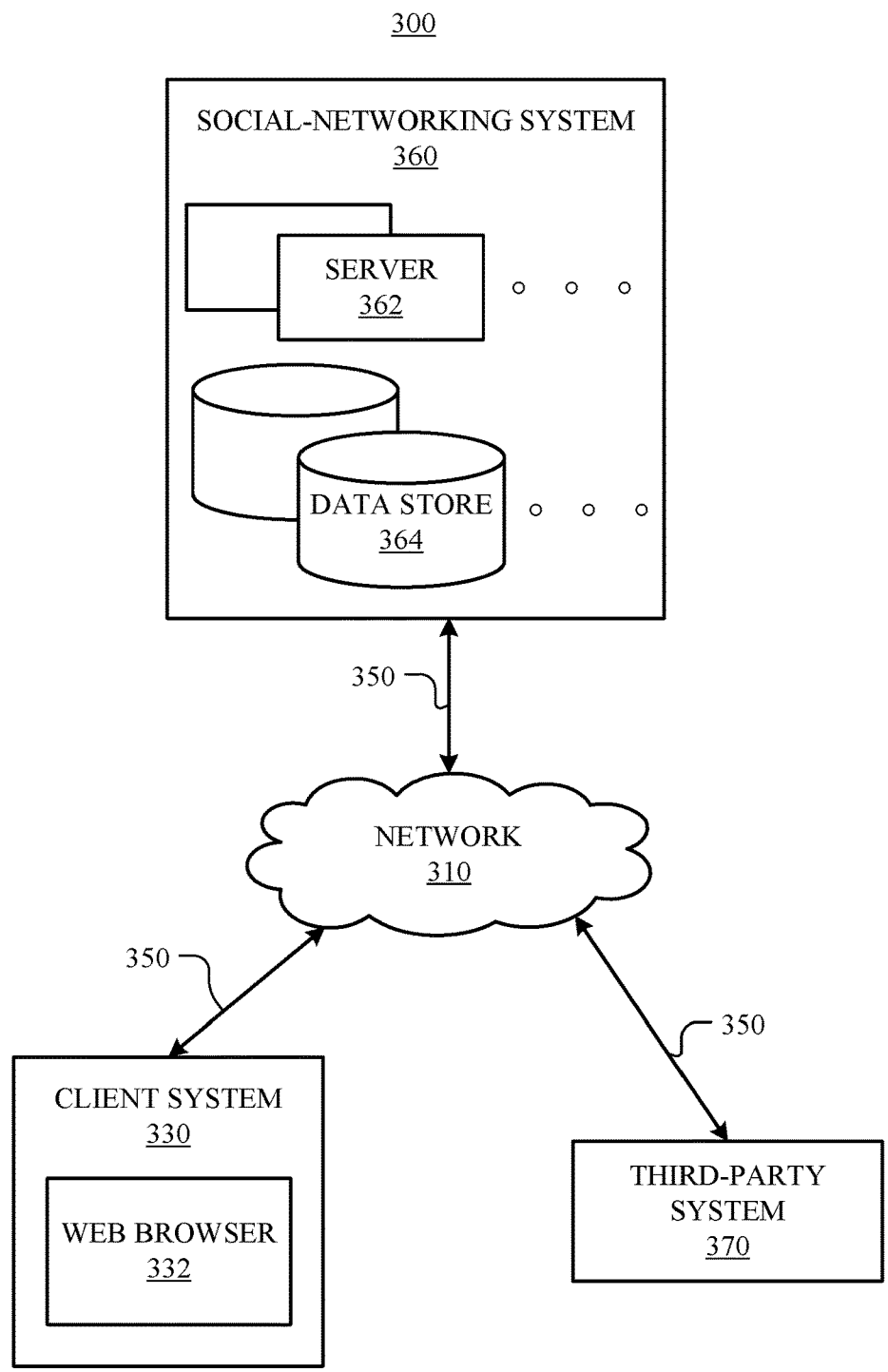
FIG. 3 illustrates an example network environment associated with a social-networking system.

FIG. 3 illustrates an example network environment 300 associated with a social-networking system. Network environment 300 includes a client system 330, a social-networking system 360, and a third-party system 370 connected to each other by a network 310. Although FIG. 3 illustrates a particular arrangement of client system 330, social-networking system 360, third-party system 370, and network 310, this disclosure contemplates any suitable arrangement of client system 330, social-networking system 360, third-party system 370, and network 310. As an example and not by way of limitation, two or more of client system 330, social-networking system 360, and third-party system 370 may be connected to each other directly, bypassing network 310. As another example, two or more of client system 330, social-networking system 360, and third-party system 370 may be physically or logically co-located with each other in whole or in part. Moreover, although FIG. 3 illustrates a particular number of client systems 330, social-networking systems 360, third-party systems 370, and networks 310, this disclosure contemplates any suitable number of client systems 330, social-networking systems 360, third-party systems 370, and networks 310. As an example and not by way of limitation, network environment 300 may include multiple client system 330, social-networking systems 360, third-party systems 370, and networks 310.

This disclosure contemplates any suitable network 310. As an example and not by way of limitation, one or more portions of network 310 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 310 may include one or more networks 310.

Links 350 may connect client system 330, social-networking system 360, and third-party system 370 to communication network 310 or to each other. This disclosure contemplates any suitable links 350. In particular embodiments, one or more links 350 include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 350 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 350, or a combination of two or more such links 350. Links 350 need not necessarily be the same throughout network environment 300. One or more first links 350 may differ in one or more respects from one or more second links 350.

In particular embodiments, client system 330 may be an electronic device including hardware, software, or embedded logic components or a combination of two or more such components and capable of carrying out the appropriate functionalities implemented or supported by client system 330. As an example and not by way of limitation, a client system 330 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 330. A client system 330 may enable a network user at client system 330 to access network 310. A client system 330 may enable its user to communicate with other users at other client systems 330.

In particular embodiments, client system 330 may include a web browser 332, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 330 may enter a Uniform Resource Locator (URL) or other address directing the web browser 332 to a particular server (such as server 362, or a server associated with a third-party system 370), and the web browser 332 may generate a Hyper Text Transfer Protocol (HTTP) request and communicate the HTTP request to server. The server may accept the HTTP request and communicate to client system 330 one or more Hyper Text Markup Language (HTML) files responsive to the HTTP request. Client system 330 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 360 may be a network-addressable computing system that can host an online social network. Social-networking system 360 may generate, store, receive, and send social-networking data, such as, for example, user-profile data, concept-profile data, social-graph information, or other suitable data related to the online social network. Social-networking system 360 may be accessed by the other components of network environment 300 either directly or via network 310. In particular embodiments, social-networking system 360 may include one or more servers 362. Each server 362 may be a unitary server or a distributed server spanning multiple computers or multiple datacenters. Servers 362 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 362 may include hardware, software, or embedded logic components or a combination of two or more such components for carrying out the appropriate functionalities implemented or supported by server 362. In particular embodiments, social-networking system 364 may include one or more data stores 364. Data stores 364 may be used to store various types of information. In particular embodiments, the information stored in data stores 364 may be organized according to specific data structures. In particular embodiments, each data store 364 may be a relational, columnar, correlation, or other suitable database. Although this disclosure describes or illustrates particular types of databases, this disclosure contemplates any suitable types of databases. Particular embodiments may provide interfaces that enable a client system 330, a social-networking system 360, or a third-party system 370 to manage, retrieve, modify, add, or delete, the information stored in data store 364.

In particular embodiments, social-networking system 360 may store one or more social graphs in one or more data stores 364. In particular embodiments, a social graph may include multiple nodes—which may include multiple user nodes (each corresponding to a particular user) or multiple concept nodes (each corresponding to a particular concept)—and multiple edges connecting the nodes. Social-networking system 360 may provide users of the online social network the ability to communicate and interact with other users. In particular embodiments, users may join the online social network via social-networking system 360 and then add connections (e.g., relationships) to a number of other users of social-networking system 360 whom they want to be connected to. Herein, the term "friend" may refer to any other user of social-networking system 360 with whom a user has formed a connection, association, or relationship via social-networking system 360.

In particular embodiments, social-networking system 360 may provide users with the ability to take actions on various types of items or objects, supported by social-networking system 360. As an example and not by way of limitation, the items and objects may include groups or social networks to which users of social-networking system 360 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 360 or by an external system of third-party system 370, which is separate from social-networking system 360 and coupled to social-networking system 360 via a network 310.

In particular embodiments, social-networking system 360 may be capable of linking a variety of entities. As an example and not by way of limitation, social-networking system 360 may enable users to interact with each other as well as receive content from third-party systems 370 or other entities, or to allow users to interact with these entities through an application programming interfaces (API) or other communication channels.

In particular embodiments, a third-party system 370 may include one or more types of servers, one or more data stores, one or more interfaces, including but not limited to APIs, one or more web services, one or more content sources, one or more networks, or any other suitable components, e.g., that servers may communicate with. A third-party system 370 may be operated by a different entity from an entity operating social-networking system 360. In particular embodiments, however, social-networking system 360 and third-party systems 370 may operate in conjunction with each other to provide social-networking services to users of social-networking system 360 or third-party systems 370. In this sense, social-networking system 360 may provide a platform, or backbone, which other systems, such as third-party systems 370, may use to provide social-networking services and functionality to users across the Internet.

In particular embodiments, a third-party system 370 may include a third-party content object provider. A third-party content object provider may include one or more sources of content objects, which may be communicated to a client system 330. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 360 also includes user-generated content objects, which may enhance a user's interactions with social-networking system 360. User-generated content may include anything a user can add, upload, send, or "post" to social-networking system 360. As an example and not by way of limitation, a user communicates posts to social-networking system 360 from a client system 330. Posts may include data such as status updates or other textual data, location information, photos, videos, links, music or other similar data or media. Content may also be added to social-networking system 360 by a third-party through a "communication channel," such as a newsfeed or stream.

In particular embodiments, social-networking system 360 may include a variety of servers, sub-systems, programs, modules, logs, and data stores. In particular embodiments, social-networking system 360 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 360 may also include suitable components such as network interfaces, security mechanisms, load balancers, failover servers, management-and-network-operations consoles, other suitable components, or any suitable combination thereof. In particular embodiments, social-networking system 360 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 360 to one or more client systems 330 or one or more third-party system 370 via network 310. The web server may include a mail server or other messaging functionality for receiving and routing messages between social-networking system 360 and one or more client systems 330. An API-request server may allow a third-party system 370 to access information from social-networking system 360 by calling one or more APIs. An action logger may be used to receive communications from a web server about a user's actions on or off social-networking system 360. In conjunction with the action log, a third-party-content-object log may be maintained of user exposures to third-party-content objects. A notification controller may provide information regarding content objects to a client system 330. Information may be pushed to a client system 330 as notifications, or information may be pulled from client system 330 responsive to a request received from client system 330. Authorization servers may be used to enforce one or more privacy settings of the users of social-networking system 360. A privacy setting of a user determines how particular information associated with a user can be shared. The authorization server may allow users to opt in to or opt out of having their actions logged by social-networking system 360 or shared with other systems (e.g., third-party system 370), such as, for example, by setting appropriate privacy settings. Third-party-content-object stores may be used to store content objects received from third parties, such as a third-party system 370. Location stores may be used for storing location information received from client systems 330 associated with users. Advertisement-pricing modules may combine social information, the current time, location information, or other suitable information to provide relevant advertisements, in the form of notifications, to a user.

Figure 4:
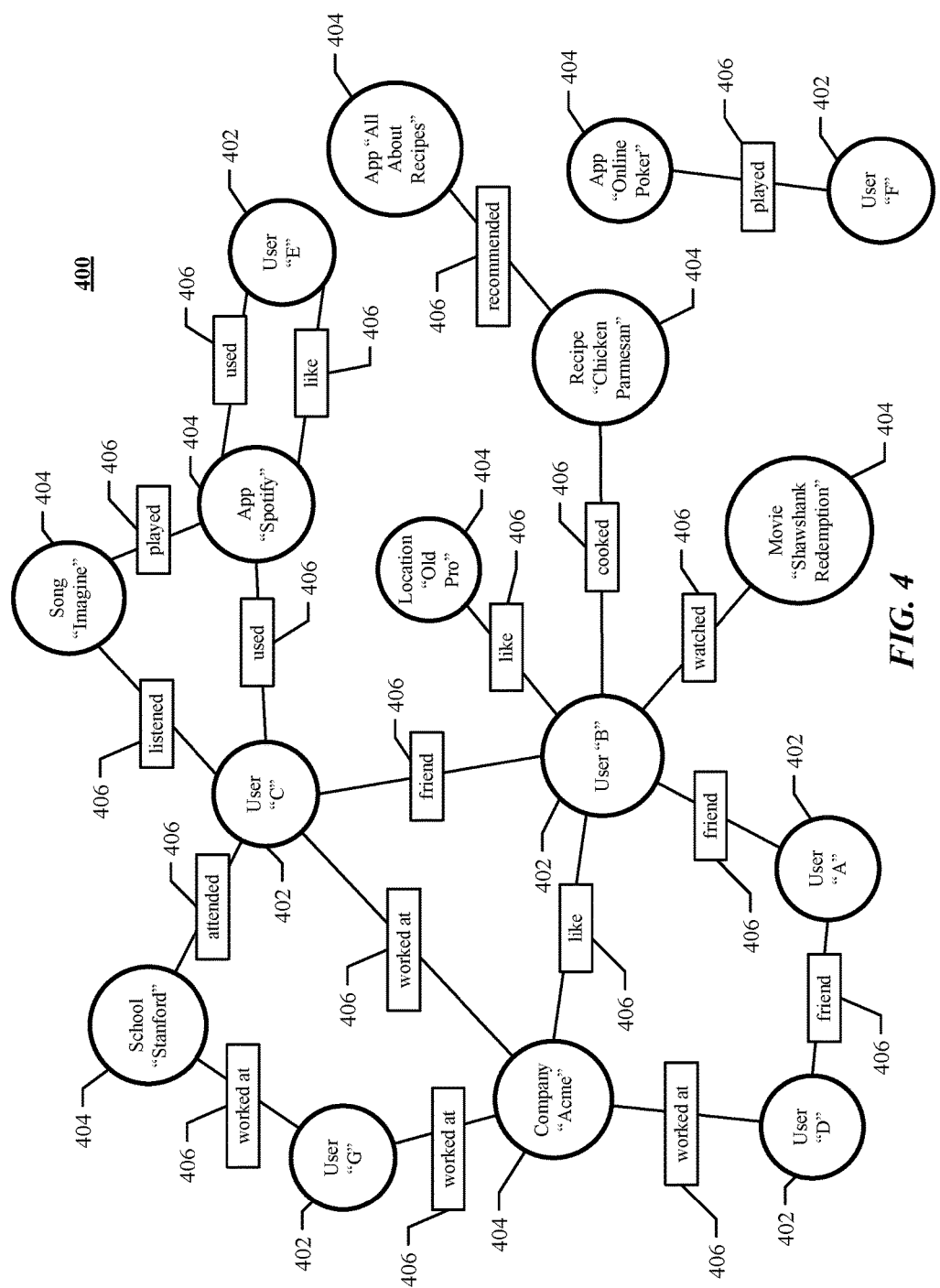
FIG. 4 illustrates an example social graph.

FIG. 4 illustrates example social graph 400. In particular embodiments, social-networking system 360 may store one or more social graphs 400 in one or more data stores. In particular embodiments, social graph 400 may include multiple nodes—which may include multiple user nodes 402 or multiple concept nodes 404—and multiple edges 406 connecting the nodes. Example social graph 400 illustrated in FIG. 4 is shown, for didactic purposes, in a two-dimensional visual map representation. In particular embodiments, a social-networking system 360, client system 330, or third-party system 370 may access social graph 400 and related social-graph information for suitable applications. The nodes and edges of social graph 400 may be stored as data objects, for example, in a data store (such as a social-graph database). Such a data store may include one or more searchable or queryable indexes of nodes or edges of social graph 400.

In particular embodiments, a user node 402 may correspond to a user of social-networking system 360. As an example and not by way of limitation, a user may be an individual (human user), an entity (e.g., an enterprise, business, or third-party application), or a group (e.g., of individuals or entities) that interacts or communicates with or over social-networking system 360. In particular embodiments, when a user registers for an account with social-networking system 360, social-networking system 360 may create a user node 402 corresponding to the user, and store the user node 402 in one or more data stores. Users and user nodes 402 described herein may, where appropriate, refer to registered users and user nodes 402 associated with registered users. In addition or as an alternative, users and user nodes 402 described herein may, where appropriate, refer to users that have not registered with social-networking system 360. In particular embodiments, a user node 402 may be associated with information provided by a user or information gathered by various systems, including social-networking system 360. As an example and not by way of limitation, a user may provide his or her name, profile picture, contact information, birth date, sex, marital status, family status, employment, education background, preferences, interests, or other demographic information. In particular embodiments, a user node 402 may be associated with one or more data objects corresponding to information associated with a user. In particular embodiments, a user node 402 may correspond to one or more webpages.

In particular embodiments, a concept node 404 may correspond to a concept. As an example and not by way of limitation, a concept may correspond to a place (such as, for example, a movie theater, restaurant, landmark, or city); a website (such as, for example, a website associated with social-network system 360 or a third-party website associated with a web-application server); an entity (such as, for example, a person, business, group, sports team, or celebrity); a resource (such as, for example, an audio file, video file, digital photo, text file, structured document, or application) which may be located within social-networking system 360 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 404 may be associated with information of a concept provided by a user or information gathered by various systems, including social-networking system 360. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 404 may be associated with one or more data objects corresponding to information associated with concept node 404. In particular embodiments, a concept node 404 may correspond to one or more webpages.

In particular embodiments, a node in social graph 400 may represent or be represented by a webpage (which may be referred to as a "profile page"). Profile pages may be hosted by or accessible to social-networking system 360. Profile pages may also be hosted on third-party websites associated with a third-party server 370. As an example and not by way of limitation, a profile page corresponding to a particular external webpage may be the particular external webpage and the profile page may correspond to a particular concept node 404. Profile pages may be viewable by all or a selected subset of other users. As an example and not by way of limitation, a user node 402 may have a corresponding user-profile page in which the corresponding user may add content, make declarations, or otherwise express himself or herself. As another example and not by way of limitation, a concept node 404 may have a corresponding concept-profile page in which one or more users may add content, make declarations, or express themselves, particularly in relation to the concept corresponding to concept node 404.

In particular embodiments, a concept node 404 may represent a third-party webpage or resource hosted by a third-party system 370. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 330 to send to social-networking system 360 a message indicating the user's action. In response to the message, social-networking system 360 may create an edge (e.g., an "eat" edge) between a user node 402 corresponding to the user and a concept node 404 corresponding to the third-party webpage or resource and store edge 406 in one or more data stores.

In particular embodiments, a pair of nodes in social graph 400 may be connected to each other by one or more edges 406. An edge 406 connecting a pair of nodes may represent a relationship between the pair of nodes. In particular embodiments, an edge 406 may include or represent one or more data objects or attributes corresponding to the relationship between a pair of nodes. As an example and not by way of limitation, a first user may indicate that a second user is a "friend" of the first user. In response to this indication, social-networking system 360 may send a "friend request" to the second user. If the second user confirms the "friend request," social-networking system 360 may create an edge 406 connecting the first user's user node 402 to the second user's user node 402 in social graph 400 and store edge 406 as social-graph information in one or more of data stores 364. In the example of FIG. 4, social graph 400 includes an edge 406 indicating a friend relation between user nodes 402 of user "A" and user "B" and an edge indicating a friend relation between user nodes 402 of user "C" and user "B." Although this disclosure describes or illustrates particular edges 406 with particular attributes connecting particular user nodes 402, this disclosure contemplates any suitable edges 406 with any suitable attributes connecting user nodes 402. As an example and not by way of limitation, an edge 406 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 400 by one or more edges 406.

In particular embodiments, an edge 406 between a user node 402 and a concept node 404 may represent a particular action or activity performed by a user associated with user node 402 toward a concept associated with a concept node 404. As an example and not by way of limitation, as illustrated in FIG. 4, a user may "like," "attended," "played," "listened," "cooked," "worked at," or "watched" a concept, each of which may correspond to a edge type or subtype. A concept-profile page corresponding to a concept node 404 may include, for example, a selectable "check in" icon (such as, for example, a clickable "check in" icon) or a selectable "add to favorites" icon. Similarly, after a user clicks these icons, social-networking system 360 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 360 may create a "listened" edge 406 and a "used" edge (as illustrated in FIG. 4) between user nodes 402 corresponding to the user and concept nodes 404 corresponding to the song and application to indicate that the user listened to the song and used the application. Moreover, social-networking system 360 may create a "played" edge 406 (as illustrated in FIG. 4) between concept nodes 404 corresponding to the song and the application to indicate that the particular song was played by the particular application. In this case, "played" edge 406 corresponds to an action performed by an external application (SPOTIFY) on an external audio file (the song "Imagine"). Although this disclosure describes particular edges 406 with particular attributes connecting user nodes 402 and concept nodes 404, this disclosure contemplates any suitable edges 406 with any suitable attributes connecting user nodes 402 and concept nodes 404. Moreover, although this disclosure describes edges between a user node 402 and a concept node 404 representing a single relationship, this disclosure contemplates edges between a user node 402 and a concept node 404 representing one or more relationships. As an example and not by way of limitation, an edge 406 may represent both that a user likes and has used at a particular concept. Alternatively, another edge 406 may represent each type of relationship (or multiples of a single relationship) between a user node 402 and a concept node 404 (as illustrated in FIG. 4 between user node 402 for user "E" and concept node 404 for "SPOTIFY").

In particular embodiments, social-networking system 360 may create an edge 406 between a user node 402 and a concept node 404 in social graph 400. As an example and not by way of limitation, a user viewing a concept-profile page (such as, for example, by using a web browser or a special-purpose application hosted by the user's client system 330) may indicate that he or she likes the concept represented by the concept node 404 by clicking or selecting a "Like" icon, which may cause the user's client system 330 to send to social-networking system 360 a message indicating the user's liking of the concept associated with the concept-profile page. In response to the message, social-networking system 360 may create an edge 406 between user node 402 associated with the user and concept node 404, as illustrated by "like" edge 406 between the user and concept node 404. In particular embodiments, social-networking system 360 may store an edge 406 in one or more data stores. In particular embodiments, an edge 406 may be automatically formed by social-networking system 360 in response to a particular user action. As an example and not by way of limitation, if a first user uploads a picture, watches a movie, or listens to a song, an edge 406 may be formed between user node 402 corresponding to the first user and concept nodes 404 corresponding to those concepts. Although this disclosure describes forming particular edges 406 in particular manners, this disclosure contemplates forming any suitable edges 406 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social-networking system 360). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 360 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social-networking system 360) or RSVP (e.g., through social-networking system 360) to an event associated with the advertisement. In addition or as an alternative, an advertisement may include social-networking-system context directed to the user. As an example and not by way of limitation, an advertisement may display information about a friend of the user within social-networking system 360 who has taken an action associated with the subject matter of the advertisement.

In particular embodiments, social-networking system 360 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 370 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 360 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 360 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 360 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 360 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 360 may calculate a coefficient based on a user's actions. Social-networking system 360 may monitor such actions on the online social network, on a third-party system 370, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social-networking system 360 may calculate a coefficient based on the user's actions with particular types of content. The content may be associated with the online social network, a third-party system 370, or another suitable system. The content may include users, profile pages, posts, news stories, headlines, instant messages, chat room conversations, emails, advertisements, pictures, video, music, other suitable objects, or any combination thereof. Social-networking system 360 may analyze a user's actions to determine whether one or more of the actions indicate an affinity for subject matter, content, other users, and so forth. As an example and not by way of limitation, if a user may make frequently posts content related to "coffee" or variants thereof, social-networking system 360 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 360 may calculate a coefficient based on the type of relationship between particular objects. Referencing the social graph 400, social-networking system 360 may analyze the number and/or type of edges 406 connecting particular user nodes 402 and concept nodes 404 when calculating a coefficient. As an example and not by way of limitation, user nodes 402 that are connected by a spouse-type edge (representing that the two users are married) may be assigned a higher coefficient than a user nodes 402 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 360 may determine that the user has a higher coefficient with respect to the first photo than the second photo because having a tagged-in-type relationship with content may be assigned a higher weight and/or rating than having a like-type relationship with content. In particular embodiments, social-networking system 360 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 360 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 400. As an example and not by way of limitation, social-graph entities that are closer in the social graph 400 (i.e., fewer degrees of separation) may have a higher coefficient than entities that are further apart in the social graph 400.

In particular embodiments, social-networking system 360 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 330 of the user). A first user may be more interested in other users or concepts that are closer to the first user. As an example and not by way of limitation, if a user is one mile from an airport and two miles from a gas station, social-networking system 360 may determine that the user has a higher coefficient for the airport than the gas station based on the proximity of the airport to the user.

In particular embodiments, social-networking system 360 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 360 may provide information that is relevant to user's interests and current circumstances, increasing the likelihood that they will find such information of interest. In particular embodiments, social-networking system 360 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 360 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 360 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 370 (e.g., via an API or other communication channel), or from another suitable system. In response to the request, social-networking system 360 may calculate the coefficient (or access the coefficient information if it has previously been calculated and stored). In particular embodiments, social-networking system 360 may measure an affinity with respect to a particular process. Different processes (both internal and external to the online social network) may request a coefficient for a particular object or set of objects. Social-networking system 360 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, field 1 Oct. 2012, each of which is incorporated by reference.

Figure 5:
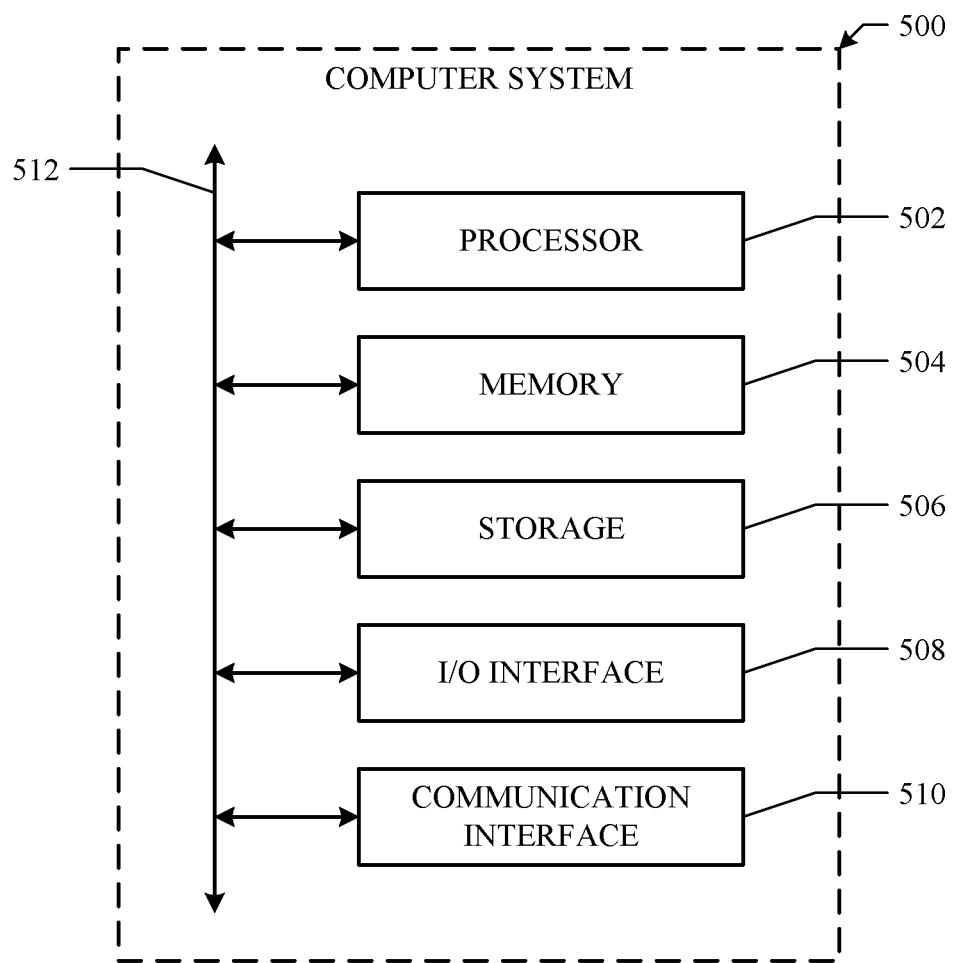
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
by a computing device, receiving a request for particular content associated with an application;
by the computing device, determining that a first recycler associated with the application includes a display object that is capable of being used for containing the particular content in accordance with a first recycling policy associated with the first recycler;
by the computing device, determining that a wrapper object that is capable of being used for encapsulating the display object is included in a second recycler associated with an operating system of the computing device in accordance with a second recycling policy associated with the second recycler, wherein the second recycler is different from the first recycler, and the second recycling policy is different from the first recycling policy;
by the computing device, encapsulating the display object with the particular content in the wrapper object provided by the second recycler;
by the computing device, returning the wrapper object encapsulating the display object in response to the request;
by the computing device, receiving an indication that the display object is no longer needed;
by the computing device, extracting the display object from the wrapper object;
by the computing device, storing the display object in the first recycler associated with the application; and
by the computing device, storing the wrapper object without the display object by the second recycler associated with the operating system of the computing device.

2. The method of claim 1, wherein the first recycler permits recycling of display objects once the first recycler includes a predetermined number of display objects.

3. The method of claim 1, wherein the storing of the display object in the first recycler is in accordance with an application-specific recycling policy, a device-specific recycling policy, or a user-specific recycling policy.

4. The method of claim 1, wherein the particular content comprises social-networking information, and wherein the display object is stored in the first recycler in association with a retrieval key generated based on identifiers associated with elements in a social graph to which the particular content is related.

5. The method of claim 1, wherein the display object is stored in the first recycler in association with a retrieval key comprising: a position of the particular content in a content layout, an identifier for the particular content, a hash key generated based on the particular content, or a timestamp of an activity related to the particular content.

6. The method of claim 1, wherein the first recycling policy is based at least in part on: application requirements, content types, device attributes, content statistics, usage patterns, or usage preferences, and determines whether the display object is suitable for re-use or recycling in accordance with the said first recycling policy.

7. The method of claim 1, wherein the second recycling policy is based at least in part on the display object for the requested particular content, and determines whether the wrapper object is suitable for re-use or recycling in accordance with the said second recycling policy.

8. One or more computer-readable non-transitory storage media embodying software that is operable when executed to:
receive a request for particular content associated with an application;
determine that a first recycler associated with an application includes a display object that is capable of being used for containing the particular content in accordance with a first recycling policy associated with the first recycler;
determine that a wrapper object that is capable of being used for encapsulating the display object is included in a second recycler associated with an operating system of the computing device in accordance with a second recycling policy associated with the second recycler, wherein the second recycler is different from the first recycler, and the second recycling policy is different from the first recycling policy;
encapsulate the display object with the particular content in the wrapper object provided by the second recycler;
return the wrapper object encapsulating the display object in response to the request;
receive an indication that the display object is no longer needed;
extract the display object from the wrapper object;
store the display object in the first recycler associated with the application; and
store the wrapper object without the display object by the second recycler associated with the operating system of the computing device.

9. The media of claim 8, wherein the first recycler permits recycling of display objects once the first recycler includes a predetermined number of display objects.

10. The media of claim 8, wherein the storing of the display object in the first recycler is in accordance with an application-specific recycling policy, a device-specific recycling policy, or a user-specific recycling policy.

11. The media of claim 8, wherein the particular content comprises social-networking information, and wherein the display object is stored in the first recycler in association with a retrieval key generated based on identifiers associated with elements in a social graph to which the particular content is related.

12. The media of claim 8, wherein the display object is stored in the first recycler in association with a retrieval key comprising: a position of the particular content in a content layout, an identifier for the particular content, a hash key generated based on the particular content, or a timestamp of an activity related to the particular content.

13. The media of claim 8, wherein the first recycling policy is based at least in part on: application requirements, content types, device attributes, content statistics, usage patterns, or usage preferences, and determines whether the display object is suitable for re-use or recycling in accordance with the said first recycling policy.

14. The media of claim 8, wherein the second recycling policy is based at least in part on the display object for the requested particular content, and determines whether the wrapper object is suitable for re-use or recycling in accordance with the said second recycling policy.

15. A system comprising:
one or more processors; and
one or more computer-readable non-transitory storage media coupled to one or more of the processors and comprising instructions operable when executed by one or more of the processors to cause the system to:
receive a request for particular content associated with an application;
determine that a first recycler associated with an application includes a display object that is capable of being used for containing the particular content in accordance with a first recycling policy associated with the first recycler;
determine that a wrapper object that is capable of being used for encapsulating the display object is included in a second recycler associated with an operating system of the computing device in accordance with a second recycling policy associated with the second recycler, wherein the second recycler is different from the first recycler, and the second recycling policy is different from the first recycling policy;
encapsulate the display object with the particular content in the wrapper object provided by the second recycler;
return the wrapper object encapsulating the display object in response to the request;
receive an indication that the display object is no longer needed;
extract the display object from the wrapper object;
store the display object in the first recycler associated with the application; and
store the wrapper object without the display object by the second recycler associated with the operating system of the computing device.

16. The system of claim 15, wherein the first recycler permits recycling of display objects once the first recycler includes a predetermined number of display objects.

17. The system of claim 15, wherein the storing of the display object in the first recycler is in accordance with an application-specific recycling policy, a device-specific recycling policy, or a user-specific recycling policy.

18. The system of claim 15, wherein the particular content comprises social-networking information, and wherein the display object is stored in the first recycler in association with a retrieval key generated based on identifiers associated with elements in a social graph to which the particular content is related.

19. The system of claim 15, wherein the first recycling policy is based at least in part on: application requirements, content types, device attributes, content statistics, usage patterns, or usage preferences, and determines whether the display object is suitable for re-use or recycling in accordance with the said first recycling policy.

20. The system of claim 15, wherein the second recycling policy is based at least in part on the display object for the requested particular content, and determines whether the wrapper object is suitable for re-use or recycling in accordance with the said second recycling policy.

\* \* \* \* \*